United States Patent [19]
Jochem et al.

[11] Patent Number: 5,032,177
[45] Date of Patent: Jul. 16, 1991

[54] METHOD AND APPARATUS FOR THE REMOVAL OF SLAG FROM METALLIC MELT BATH IN A MELTING FURNACE

[75] Inventors: Hans-Otto Jochem; Franz Engelberg, both of Constance, Fed. Rep. of Germany

[73] Assignee: Gautschi Electro-Fours SA, Tagerwilen, Switzerland

[21] Appl. No.: 554,680

[22] Filed: Jul. 19, 1990

[30] Foreign Application Priority Data

Aug. 23, 1989 [CH] Switzerland .................. 3050/89

[51] Int. Cl.$^5$ .................. C22B 9/16; C22B 9/187
[52] U.S. Cl. .................. 75/708; 75/672; 266/230; 266/237; 266/240; 266/228
[58] Field of Search .................. 75/708, 672; 266/227, 266/228, 229, 230, 237, 240

[56] References Cited
U.S. PATENT DOCUMENTS

4,415,144 11/1983 Klotz et al. .................. 266/228
4,460,166 7/1984 Ritchie et al. .................. 266/228

*Primary Examiner*—Melvyn J. Andrews
*Attorney, Agent, or Firm*—Sandler, Greenblum & Bernstein

[57] ABSTRACT

By means of an electromagnetic stirrer there is produced in the melt within the melt chamber of the melting furnace a turbulent flow or pair of turbulent flows working in opposite directions and each having a substantially vertical turbulent flow axis. By means of this turbulent flow the upwardly floating slag is forced towards the outermost turbulent flow lines or regions and into an auxiliary chamber formed between a slag barricade and the furnace door. The melt can flow back from the auxiliary chamber into the melt chamber. The slag collected in the auxiliary chamber can be removed in predeterminate time intervals from the auxiliary chamber by means of a slag removal sliding or pusher element and disposed in an environmentally protective fashion in a slag container moved into position at the opened furnace door. The slag collected in the auxiliary chamber, upon opening of the furnace door, can be lifted upon a slag palette or platform with the aid of lifting or buoyant bodies above the lower edge of the furnace door opening.

27 Claims, 4 Drawing Sheets

METHOD AND APPARATUS FOR THE REMOVAL OF SLAG FROM METALLIC MELT BATH IN A MELTING FURNACE

BACKGROUND OF THE INVENTION

The present invention broadly relates to a new and improved method of, and apparatus for, the removal of slag from the metallic melt bath of a melting furnace.

More specifically, the present invention relates to a method of, and apparatus for, removing slag from the metallic melt bath of a melting furnace which houses or takes up the metallic melt in a melt or melting chamber and is provided with means in order to place the melt into motion within the melt chamber. The melting furnace includes a furnace door arranged at one side of the melting furnace.

When melting metals in a melting furnace slag of a specifically lower weight floats upon the surface of the melt. This slag must be removed from this location at predeterminate time intervals, especially before pouring out or tapping of the melt. This operation is commonly referred to as "scraping" of the slag. With conventional slag scraping methods the furnace door of the melting furnace is opened throughout the entire width of the melting furnace and the slag is scraped away from the melt surface with the aid of a sliding or pusher element and deposited into a slag bucket. This slag sliding element, used for performing the slag scraping operation, is located at the end of a long, heavy steel support or carrier which must extend to the boundary wall of the melting furnace and which must be moved in a rather cumbersome manner by means of a fork lift truck or the like.

Since with the conventional techniques the slag is distributed throughout the entire metal bath surface it must be engaged throughout a large surface area by the slag sliding or pusher element, which is positioned by the fork lift truck, and with the melting furnace door completely open. By virtue of the wide opening of the melting furnace door there arise considerable thermal losses. Additionally, there must be engaged and sucked away with the help of a large size suction hood, which extends over the entire width of the melting furnace, the dust or the like which is released and ascends during the slag scraping operation. The large suction cross-sectional area requires a large suction flow or stream with corresponding great energy expenditure.

Improved melting processes use electromagnetic stirrers, briefly known as "ems", which when, appropriately positioned or arranged place the melt into a desired path of motion. Prior art methods which employ such electromagnetic stirrers, however, use such only for moving and intensively admixing the melt. An appreciable improvement of the slag removal operation and a reduction of the energy losses during the scraping operation are not realized by these known melting processes working with electromagnetic stirrers.

SUMMARY OF THE INVENTION

Therefore, with the foregoing in mind, it is a primary object of the present invention to provide a new and improved method of, and apparatus for, the removal of slag from the metallic melt bath of a melting furnace which does not suffer from the aforementioned drawbacks and shortcomings of the prior art methods and apparatuses.

Another and more specific object of the present invention aims at the provision of a new and improved method of, and apparatus for, the removal of slag from the metallic melt bath of a melting furnace, especially allows for the scraping away of the slag in a more simple manner than was heretofore possible and with lesser thermal energy losses of the melt bath as well as being accomplished in an environmentally protective manner with an exceedingly low dust load or contamination.

Now in order to achieve these and still further objects of the present invention which will become more readily apparent as the description proceeds, the method of removing slag from the metallic melt bath of a melting furnace is manifested, among other things, by the features that the melt within the melting furnace is placed by suitable means, such as a pump or an electromagnetic stirrer, into a flow in the form of a turbulent flow or stream or a pair of turbulent flows or streams which work or flow in opposite directions and each of which have a substantially vertically or upright extending turbulent flow axis or turbulence axis. Each such flow displaces the up-floating slag towards the outer turbulent flow lines or regions and into an auxiliary chamber formed behind a slag barricade or blocking means at the region of the furnace door. At the auxiliary chamber the melt is circulated back through the slag barricade means into the melting chamber and the slag which has collected in the auxiliary chamber is removed therefrom at predetermined time intervals with the aid of a slag displacement or removal element, such as a slag sliding or pusher element and/or a floatable lifting or buoyant device and is disposed of or collected in an environmentally protective fashion in a slag container.

Since the entire melt bath is moved in the form of a turbulent flow or stream or a pair of oppositely moving turbulent flows or streams, each of which have a substantially vertical or upright turbulence axis, the slag which floats up to the surface of the melt bath is placed into a rotary or rotational motion and the centrifugal forces acting thereupon displace the slag to the outer flow lines or regions of the turbulent flow or stream or the turbulent flows or streams. Consequently, the slag collects at these outer flow lines or regions and behind the slag barricade means which retains or holds back the up-floating slag but not the melt bath, and such slag is prevented from any circulation or flow back into the melting chamber. The slag which is held back or captured within the confines of the auxiliary chamber formed between the furnace door and the slag barricade means then can be removed and disposed of. Since the surface of this auxiliary chamber can be appreciably smaller than the entire surface of the melt bath the slag disposal can be accomplished with simpler means, with less energy expenditure, lower thermal losses of the melt bath and lower dust development.

The method further contemplates producing oppositely moving turbulent flow pairs in the melting chamber by means of a centrally disposed electromagnetic stirrer located beneath the melting chamber and additionally augmenting the turbulent flows or streams by further electromagnetic stirrers or pumps acting laterally at the height or level of the metallic bath. In this way there can be intentionally influenced the transport flow for the slag into the auxiliary chamber.

As already alluded to above the invention is not only concerned with the aforementioned method aspects, but also relates to an improved construction of apparatus for the removal of slag from the metallic melt bath of a melting furnace in accordance with the inventive method. This apparatus, among other things, is manifested by the features that means, such as a pump or electromagnetic stirrer, are provided for generating within the melting chamber of the melting furnace a turbulent flow or a pair of turbulent flows or streams which work or flow in opposite directions and each of which have a substantially vertical or upright turbulence axis. There is further provided slag barricade or blocking or obstruction means which extend into the slag chamber and which form at the side of the furnace door an auxiliary chamber located at the region of the outer or external turbulent or turbulence flow lines. Within the confines or boundaries of this auxiliary chamber there is collected the slag which floats up to the surface of the melt and which can be disposed of upon opening of the furnace door.

In order to attain an optimum transport flow of the slag into the auxiliary chamber behind the slag barricade means there can be provided further pumps or electromagnetic stirrers. These further pumps or electromagnetic stirrers are advantageously arranged at the height of the level of the melt bath in the melting chamber and augment or intensify the sense of rotation or rotary motion of the neighboring turbulent flow or stream.

Additionally, the slag barricade or blocking means should be readily passable by the melt. To that end, it is contemplated that the slag barricade means is constituted by plates having throughflow openings for the melt and which are parallel to the furnace door and extend at a spacing form the same and protrude into the melting chamber. The slag barricade means could be alternatively constituted by beams or beam members beneath which there flows the melt and which extend beyond the melt level or surface into the melting chamber in order to hold back the inflowing and up-floating slag. When there are used beams or the like extending at the height of the melt bath level, then the melt can flow beneath the slag barricade means directly below the surface of the melt bath. When using plates having throughflow openings and serving as the slag barricade means it is possible that smaller slag particles will be entrained by the recirculating or return flowing melt, but there is nonetheless achieved the effect that following a number of recirculations the slag will cake into larger, lighter and more rapidly disposable slag lumps or aggregations.

By virtue of the arrangement of the slag barricade or blocking means in front of the furnace door while forming an auxiliary chamber with free inflow of the melt while blocking outflow of the slag, the slag collects in the direct region of the furnace door in a corner of the melt bath. For scraping away the slag it is no longer necessary for the furnace door to be opened throughout the entire width of the furnace. Quite to the contrary, it is sufficient to maintain open the partial section of the furnace door in front of the slag barricade or blocking means. Also the furnace door during the removal of the slag out of the auxiliary chamber need not be completely opened towards the top, since it is not necessary to engage the slag distributed over the entire surface of the melt bath. Rather, the slag can be removed out of the auxiliary chamber directly in the neighborhood of the furnace door with the aid of a relatively short slag removal element, such as the aforementioned slag sliding or pusher element. As a result the required slag scraping time is shortened and the required opening in the furnace side wall can be maintained appreciably smaller. Due to the foregoing there result lesser thermal energy losses as well as a reduced release of dust during a shorter time interval. A smaller suction hood or the like, which is accommodated to the relatively infrequently opened furnace door, is sufficient for achieving the sucking away or removal of the dust. Hence, in contrast to the known methods the requisite energy expenditure for conveying the suction air becomes appreciably smaller. This is of particular significance in the case of melts whose slag contains many fine grained constituents and dust.

It is particularly advantageous in the case of a melting furnace which can be upwardly pivoted or rocked at the side of the furnace door if the floor of the auxiliary chamber is elevated in relation to the floor of the melting chamber. Hence, when upwardly pivoting the melting furnace at the side of the furnace door the melt flows back from the auxiliary chamber into the melting chamber and the slag deposits at the base or floor of the auxiliary chamber. Consequently, the slag can be then removed or scraped in a so-to-speak "dry" condition from the floor of the auxiliary chamber into a slag container or receptacle which has been moved into a ready position at the open furnace door.

With a melting furnace which is not pivotable there is advantageously used a construction wherein the auxiliary chamber is structured as a shaft or chute in which there is vertically movably guided at least one floatable or buoyant lifting body or body member which carries a slag palette or platform reposing thereupon. Moreover, at the furnace door there are mounted or provided holddown elements which, when the furnace door is closed, press the lifting body and the slag palette or platform reposing thereupon beneath the level of the melt bath. Thus, the slag can swim freely into the auxiliary chamber. When the furnace door is opened these holddown elements release the slag palette or platform so it can ascend under the buoyant action of the lifting body. A further possible design contemplates dimensioning the slag palette or platform and the lifting body such that the slag palette or platform which floats upwardly when the furnace door is opened has the upper or top surface of the slag palette located at a greater elevation than the lower edge of the furnace door. Due to these constructions the slag which has collected in the auxiliary chamber is advantageously placed in a ready state for removal above the lower edge of the furnace door upon opening of the furnace door.

If it is desired that the slag automatically slide into the slag container which has been placed in its proper slag collecting position then other constructions are still possible. For instance, the slag palette or platform can be constructed from a number of separate palettes or platforms, so that the respective individual palettes together with the slag deposited thereupon, during a plurality of slag scraping operations, can be transported away as throwaway or one-time usable palettes by means of the slag container or receptacle. A further design contemplates that there are arranged as the lifting body a number of floating or buoyant bodies of different water displacement, for example, closed tubes or pipes or different diameter, or if these tubes or pipes have the same diameter then they are stacked in different numbers in superimposed fashion upon one another while extending parallel to the furnace door and adjacent one another in the auxiliary chamber. The free floatable lifting bodies, in the direction of the furnace door, protrude less above the melt level or surface, so that the slag palettes resting upon the lifting bodies have imparted thereto an inclination with respect to the opened furnace door during floating up of the lifting bodies. As a result, if desired, there arises an automatic sliding of the slag alone or else the slag palette or platform together with the slag into the slag container which has been placed in its ready position.

In order to prevent as much as possible the accumulation of slag outside of the auxiliary chamber, especially in difficultly accessible regions of the melting chamber, it is advantageous to round in a flow-proper manner the corners of the melting chamber located opposite the furnace door.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the different embodiments of melting furnace has been illustrated therein as is needed to enable one skilled in the art to readily understand the underlying principles and concepts of this invention.

Figures 1, 3:
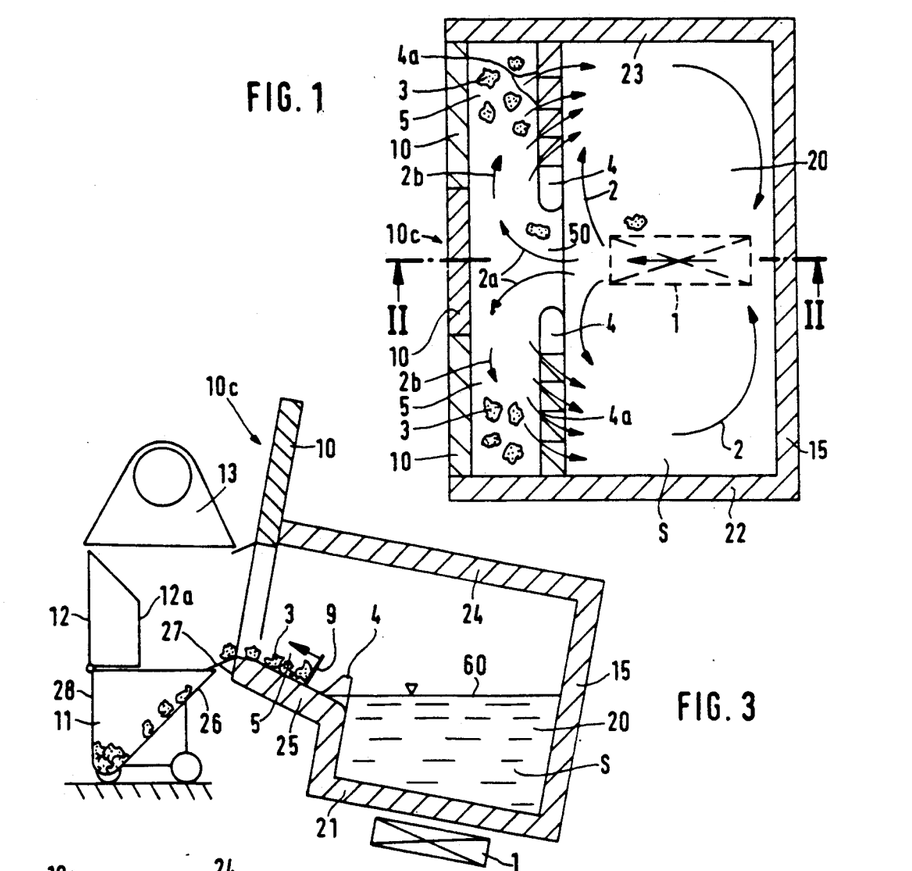
FIG. 1 depicts in a simplified view a horizontal section through a melting furnace according to a first exemplary embodiment of the invention.
FIG. 3 is a vertical section of the melting furnace corresponding generally to that of FIG. 2 for portraying the removal of the slag.
Figure 2:
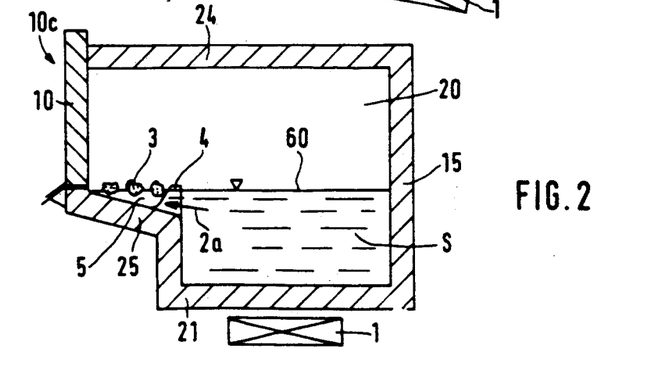
FIG. 2 is a vertical section of the melting furnace of FIG. 1 taken substantially along the line II—II thereof.

Turning attention now to the first exemplary embodiment of FIGS. 1 to 3, there is depicted therein a melting furnace which contains within its melting chamber 20 a melt or melt bath S formed of a suitable metal, here assumed to be aluminum. This melting furnace is pivotable or tiltable in order to be able to remove the slag and possesses a lengthwise or longitudinal wall 15, side walls 22 and 23 and a cover or roof 24. Situated opposite the lengthwise or longitudinal wall 15 is a furnace door or door means 10c composed of a number of, in this embodiment three, sliding doors 10. These sliding doors 10 can be mutually independently upwardly displaced or pulled in order to be able to open the melting furnace. FIG. 3 depicts the melting furnace in its upwardly pivoted position and with the furnace door 10c open.

With the exemplary embodiment of FIGS. 1 to 3 there is arranged an electromagnetic stirrer 1 beneath the furnace floor or base 21 and approximately centrally below the melt bath in the melting chamber 20. This electromagnetic stirrer 1 generates in the melt S an oppositely directed or working pair of turbulent flows or streams 2, each having a substantially vertical or upright turbulence axis. These turbulent flows 2 induce in the melt S, in the direction of the furnace door 10c, a melt flow or stream 2a which at that location while damming-up behind the closed furnace door 10c, as generally indicated by the arrows 2b, is deflected towards the furnace side walls 22 and 23, respectively. At this point it is mentioned that the electromagnetic stirrer 1 can be replaced by a suitable pump which acts upon the melt S and thus reference numeral 1 is to be conceptually also considered to constitute such pump.

A respective slag barricade or blocking member 4 extends into each of both turbulent flows or streams 2 from both of the side walls 22 and 23. These slag barricades or blocking members 4 extend from the furnace side walls 22 and 23 substantially parallel to the furnace door 10c and at a spacing therefrom which is less that the spacing to the lengthwise wall 15. A free space 50 remains between the inner free ends of the slag barricade or blocking members 4 through which there can flow the melt flow 2a freely towards the furnace door 10c into an auxiliary chamber or bypass channel means 5. This auxiliary chamber or bypass channel means 5 is formed, due to the previously explained construction, between the furnace door 10c and the slag barricade or blocking members 4. These slag barricade or blocking members 4 extend upwardly somewhat past the level or surface 60 of the melt S within the melting chamber 20. Moreover, these slag barricade or blocking members 4 are designed such that throughflow openings 4a located slightly below the melt level or surface 60 render possible the circulation of the melt S through the slag barricade or blocking members 4. The slag 3 which floats up to the surface of the melt S is displaced under the action of the centrifugal force to the outer or external turbulent flow lines or regions and transported into the auxiliary chamber 5 through the free space or opening 50 situated between both of the slag barricade or blocking members 4. While the melt S and possibly smaller slag particles can recirculate back into the melting chamber 20 through the slag barricade or blocking members 4, the slag 3 progressively collects at the surface 60 of the melt S located in the auxiliary chamber 5. As will be recognized by referring to FIG. 3, from the location of the auxiliary chamber 5 the slag 3 can be removed with the aid of a relatively short slag sliding or pusher element 9 into a slag container or receptacle 11 and with the furnace door 10c only slightly opened.

With the exemplary embodiment of FIGS. 1 to 3 the removal of the slag 3 is further simplified in that, as particularly depicted in FIGS. 2 and 3, the floor or base 25 of the melting furnace at the region of the auxiliary chamber 5 is elevated in relation to the actual melting chamber floor or base 21. Thus, by upwardly displacing or pivoting the melting furnace at the side of the furnace door 10c the melt S flows back out of the auxiliary chamber 5 into the melting chamber 20 and the slag 3 deposits upon the base or bottom or floor 25 of the auxiliary chamber 5. The elevational difference between the raised or elevated floor or base 25 of the auxiliary chamber 5 and the floor or base surface of the actual melting chamber 20 is advantageously selected such that with closed and non-pivoted melting furnace the draft in the auxiliary chamber 5 is just sufficient that the slag 3 can swim through between the slag barricade or blocking members 4 into the auxiliary chamber 5 behind the slag barricade or blocking members 4. Even a slight upward pivoting of the melting furnace into the position of FIG. 3 is then sufficient to cause the melt S to flow back out of the auxiliary chamber 5 into the melting chamber 20 and the slag 3 to remain deposited upon the floor or base 25 of the auxiliary chamber 5.

By using the sliding or pusher element 9 it is then possible to expel the slag 3 in a so-to-speak "dry" state into the slag container or receptacle 11 which has been moved into ready position at the opened furnace door 10c. This slag container or receptacle 11 is constructed such that there is avoided a large drop height of the scraped away slag 3 and the therewith associated intensified development of dust. The wall 26 of the slag container or receptacle 11, and which wall 26 confronts the melting furnace, possesses an inclination angle which is somewhat larger than the angle of incline or slope of the slag 3 and the upper edge of the wall 26 can be pushed directly beneath the sheet metal skirt 27 of the furnace door 10c, as best seen by referring to FIG. 3. Thus, during the slag scraping operation the slag 3 drops from a lesser height upon the inclined side wall 26 of the slag container or receptacle 11 and slides downwardly along this side wall 26, with the least development of dust, into the slag container or receptacle 11.

The wall 28 of the slag container or receptacle 11 and which wall faces away from the melting furnace, extends substantially vertically or upright in order to maintain small the open cross-sectional surface of the slag container or receptacle 11 and thus also the inlet cross-section of the suction hood 13 or the like which is located above the slag container or receptacle 11. The upwardly pivoted cover 12 of the slag container or receptacle 11 and which is provided with the side screens or diaphragms 12a, prevents dust from laterally ascending without being acted upon by the suction of the suction hood 13. When the cover 12 is closed the slag container or receptacle 11 can be transported without dust development.

Figure 4:
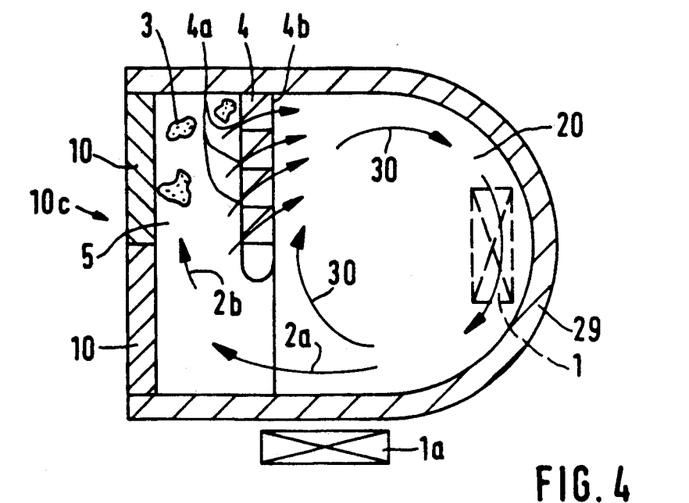
FIG. 4 depicts in schematic illustration a horizontal section through a melting furnace according to a second embodiment of the invention.
Figure 4A:
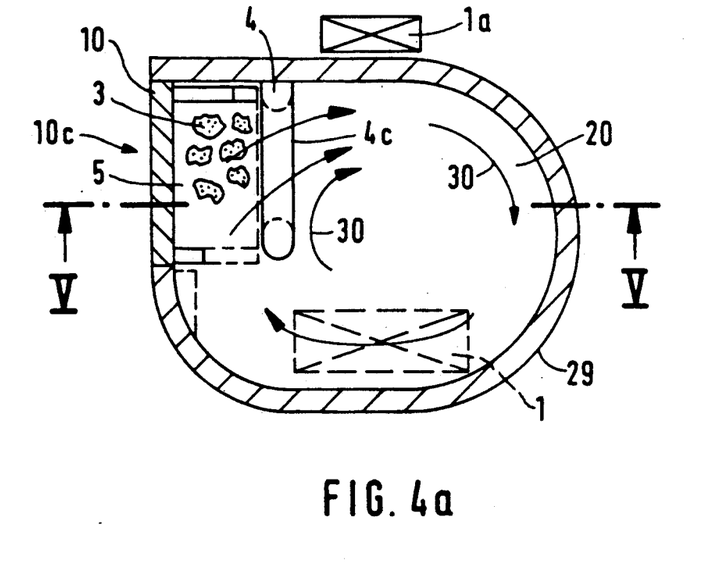
FIG. 4a likewise depicts in schematic illustration a horizontal section through a melting furnace according to a third embodiment of the invention.

The embodiments of melting furnace depicted in FIGS. 4 and 4a first of all differ from the just described embodiment of melting furnace depicted in FIGS. 1 to 3 in that, there is provided a flow-favorable rounded or curved constructed lateral boundary or side or boundary wall 29 of the melting chamber 20. Additionally, in both of these further embodiments there is generated in the melt S in each case only one turbulent flow or stream, indicated by the arrows 30, and having a substantially vertical or upright turbulence axis.

Just as was the case for the first exemplary embodiment the turbulent flow or stream 30 is here likewise generated by an electromagnetic stirrer 1 (or pump) which, however, is here not centrally arranged, rather at the region of the boundary or chamber wall 29 beneath the melting chamber 20. Additionally, with both embodiments there is arranged in each case an additional electromagnetic stirrer 1a (or pump) approximately at the height of the melt bath level or surface within the melting chamber 20. These additional electromagnetic stirrers or pumps 1a augment or intensify the associated turbulent flow or stream in the direction of rotation thereof. In this manner there is induced an additional velocity at the melt surface which causes a stronger centrifugal force to act upon the slag 3 floating in the turbulent flow or stream 30. Consequently, the slag 3 is forced with an acceleration towards the outer turbulent flow lines or region. The rounded or curved side wall 29 of the melting chamber 20, with these embodiments, prevents that slag 3 will reside for longer periods of time in the release or detachment regions of wall corners located remote from the inlet of the auxiliary chamber 5 and which are difficult to reach during the slag scraping operation.

Analogously and namely governed by the replacement of the two turbulent flows or streams 2 of the first discussed embodiment with a single turbulent flow or stream 30 in each of the embodiments of FIGS. 4 and 4a, there is required in each case only a single slag barricade or blocking member 4. This single slag barricade or blocking member 4 extends from the chamber or side wall 29 substantially parallel to the furnace door 10c and is located at a comparatively small spacing therefrom. The single slag barricade or blocking member 4 extends into the associated turbulent flow or stream 30 and delimits between itself and the furnace door 10c an auxiliary chamber 5. Just as in the first discussed embodiment of FIGS. 1 to 3, here also the slag 3 which floats up to the surface of the melt S and is displaced by the centrifugal force to the outer or external turbulent flow lines or region, is transported and held back in the auxiliary chamber 5, whereas the melt and possibly smaller slag particles or constituents recirculate back into the actual melting chamber 20.

In the exemplary embodiment of FIG. 4 the slag barricade or blocking member 4 is formed by a plate or plate member 4b which has openings or apertures 4a extending from the auxiliary chamber 5 to the actual melting chamber 20. The upper edge of this plate member 4b again extends upwardly somewhat past the melt level or surface.

On the other hand, with the embodiment of FIG. 4a the slag barricade or blocking member 4 is formed by a beam or beam member 4c extending at the level or surface of the melt bath. This beam or beam member 4c retains the up-floating slag including smaller slag particles, whereas the circulating melt can flow beneath such beam or beam member 4c.

Based upon FIGS. 5 and 5a there will now be explained how the slag 3 can be removed from a melting furnace like that of FIG. 4a, without having to pivot the melting furnace as was the case for the first exemplary embodiment of FIGS. 1 to 3.

With the furnace door 10c closed, a floatable or buoyant lifting body 7, which is placed in the auxiliary chamber 5 between the furnace door 10c and the slag barricade or blocking member 4, presses a slag palette or platform 6, advantageously formed of ceramic material, upwardly against holding brackets or bracket members 10a mounted at the furnace door 10c. These holding brackets or bracket members 10a hold the slag palette 6 beneath the melt surface 60 so that the slag 3 can be transported by the melt flow, without hindrance by the slag palette 6, into the auxiliary chamber 5 and can accumulate at that location while held back by the slag barricade or blocking member 4. Boundary ribs or plugs 31 which extend upwardly from the slag palette 6 ensure that the slag 3 can be transported without hindrance by the turbulent flow or stream into the auxiliary chamber 5 bounded by the slag barricade or blocking member 4. As already explained, the slag barricade or blocking member 4 has the melt flowing therebelow as indicated in this embodiment by the arrow 32. Since in this case there are not present any throughflow openings at the slag barricade or blocking member 4 at the level of the melt surface, here the entire floating slag 3 which has arrived at the auxiliary chamber 5 is held back, even the smaller slag particles.

Upon opening of the furnace door 10c for removal of he slag 3 (FIG. 5a) the holding bracket 10a secured to the furnace door 10c, releases the slag palette 6 and the latter is raised by the buoyed or up-floating lifting body 7. As soon as during this lifting operation a projection or protuberance 6a of the slag palette 6 reaches the vicinity of a projection or protuberance 6b of the side wall, then the further ascending lifting body 7 which is guided in a lifting body shaft or chute 8, initiates a pivoting of the slag palette or platform 6 about the projection 6b. The upwardly pivoted slag palette 6 then allows the slag 3 released from the melt bath to slide out of the auxiliary chamber 5 into the slag container or receptacle 11 which has been placed in its ready or proper slag receiving position.

The underside of the slag palette 6 can be domed or arched such that there is possible a favorable application of the force of an appropriately configured lifting body during the lifting operation. In the embodiment of FIGS. 5 and 5a the lifting body 7 is formed by a ceramic tube or pipe which is closed at both ends. Such a lifting body 7 can be economically fabricated from commercially available tubes or pipes. Additionally, the danger of canting or binding is less great when there is used a tube or pipe in comparison with other body or geometrical shapes. Instead of using a single lifting tube or pipe there can be employed a plurality of lifting tubes or pipes which may even be arranged in a number of layers or levels above one another. In this connection the lifting bodies can possess unequal water displacement depending upon the desired lifting action and the inclination of the slag palette or platform upon opening of the furnace door. This can be achieved, for instance, by using different tube or pipe diameters or, with the same tube or pipe diameter by using a different number of tubes or pipes which are stacked or superimposed above one another.

Figure 5:
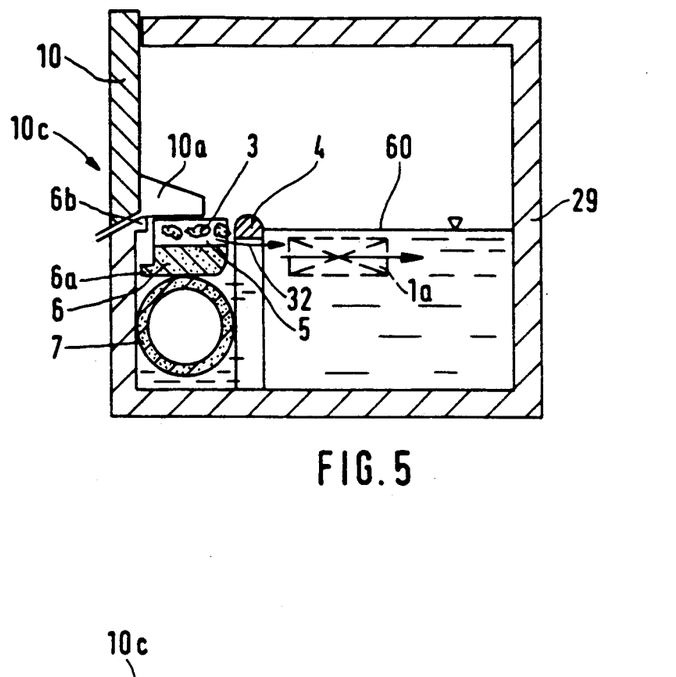
FIG. 5 is a vertical section of the melting furnace of FIG. 4a taken substantially along the line V—V thereof.
Figure 5A:
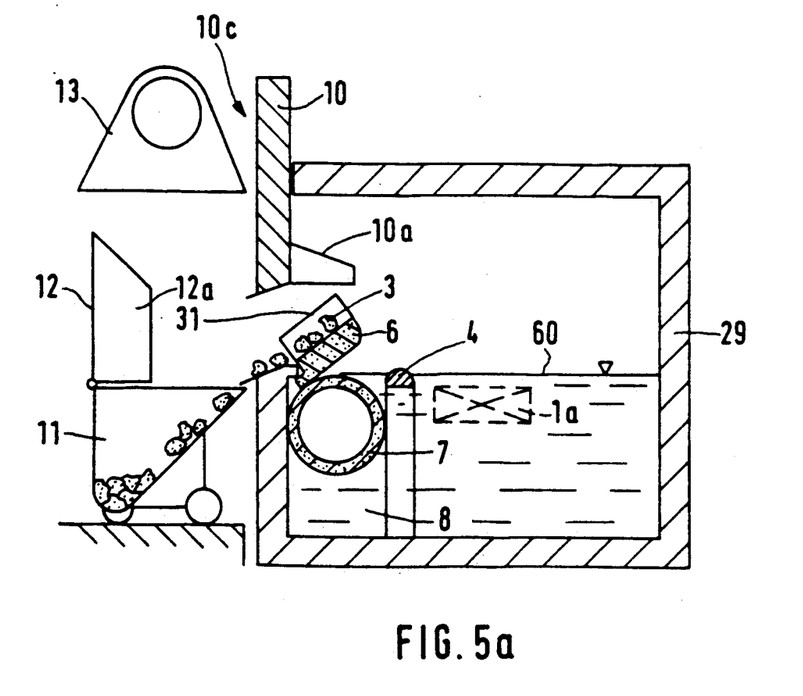
FIG. 5a is a vertical section of the melting furnace corresponding generally to that of FIG. 5 for portraying the removal of the slag.
Figure 6:
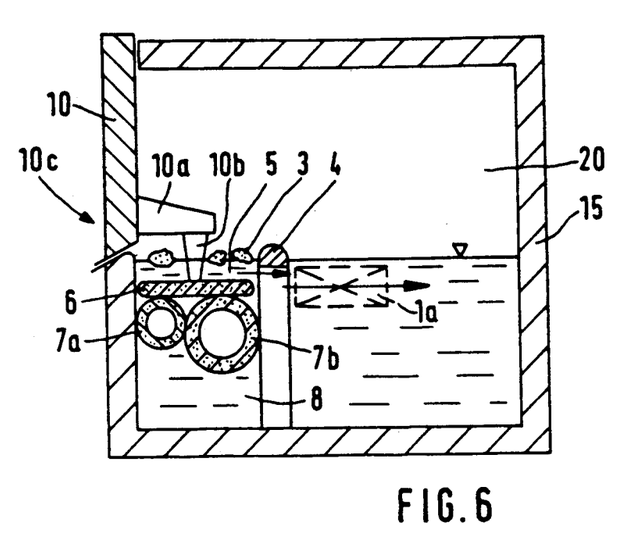
FIG. 6 is a vertical section corresponding to that of FIG. 5 showing a variant of this melting furnace construction.
Figure 6A:
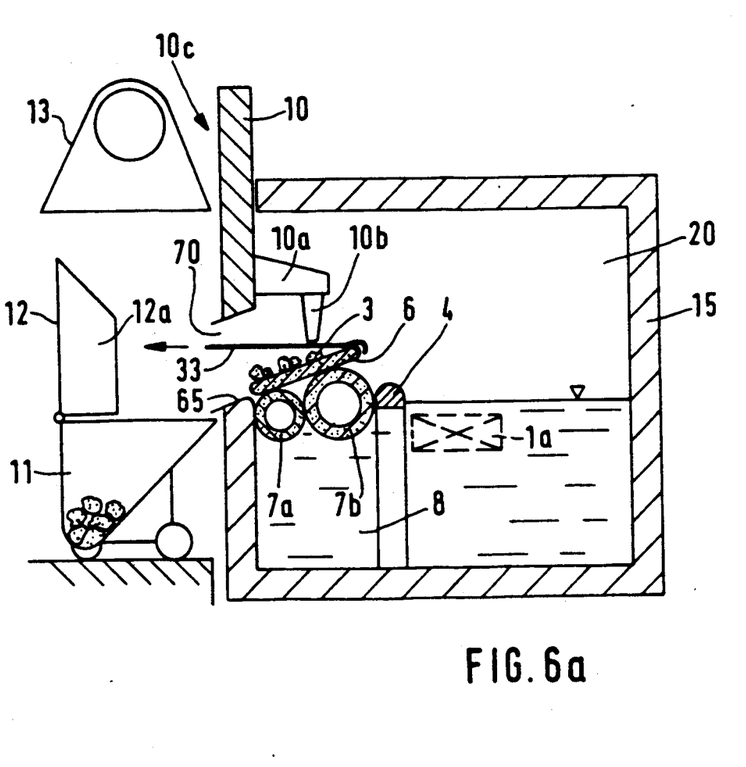
FIG. 6a illustrates the melting furnace according to FIG. 6 with open furnace door and during the slag removal.

FIGS. 6 and 6a depict an embodiment similar to that of FIGS. 5 and 5a, however with two lifting tubes or pipes 7a and 7b of different size. The lifting tube or pipe 7a which has the smaller diameter is disposed at the region of the furnace door wall in the lifting body shaft 8. Above both of these lifting tubes 7a and 7b there is loosely disposed a relatively thin, planar, simply formed slag palette 6. When the furnace door 10c is closed, as shown in FIG. 6, then this slag palette 6 is pressed down below the level of the melt by the action of holding pins or plugs 10b or the like depending downwardly from the holding brackets 10a. As a result the slag 3 which has floated up to the surface of the melt can swim without hindrance by the turbulent flow or stream into the thus formed auxiliary chamber 5 where it is held back by the slag barricade or blocking member 4 whereas the melt can recirculate back either through or beneath this slag barricade or blocking member 4 into the melting chamber 20.

As will be apparent from FIG. 6a upon opening the furnace door 10c the holding pins or plugs 10b are conjointly raised, so that the slag palette or platform 6 is no longer fixedly retained and under the action of the up-floating or buoyed lifting tubes or pipes 7a and 7b is raised in conjunction with the slag 3 reposing thereupon beyond the lower edge 65 of the furnace door opening 70. Due to the foregoing arrangement of the different size lifting tubes or pipes 7a and 7b with the lifting tube 7a of smaller diameter closer to the furnace door 10c, during the ascent of the lifting bodies 7a and 7b, there is realized a desired inclination of the slag palette 6 towards the furnace door 10c so that the slag palette 6 together with the slag 3 located thereon can be displaced into the slag container 11 by means of, for instance, a slag removal element such as the hook 33 (FIG. 6a) and there can be accomplished a proper disposal of such slag 3. Such throwaway slag palettes 6, which can be used one time, can be fabricated of inexpensive materials, for instance, sintered together slag and produced in handy shapes or formats, so that a plurality of these throwaway slag palettes 6 can be arranged adjacent one another or stacked on top of one another upon the lifting bodies. As a result there can be undertaken during a melting operation a number of scraping operations without the need to introduce new slag palettes 6.

While there are shown and described present preferred embodiments of the invention, it is to be distinctly understood that the invention is not limited thereto, but may be otherwise variously embodied and practiced within the scope of the following claims. Accordingly,

What we claim is:

1. A method for the removal of slag from a metallic melt bath in a melting furnace having a melting chamber and a furnace door, comprising the steps of:

placing the metallic melt bath within the melting furnace into a flow in the form of at least one turbulent flow having a substantially vertical turbulence axis and outer flow lines by using electromagnetic stirrer means;

displacing by means of said at least one turbulent flow the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber;

periodically removing the slag from the auxiliary chamber out of the melting furnace; and disposing of the removed slag in an environmentally protective manner in a slag container.

2. The method as defined in claim 1, wherein the step of:

periodically removing the slag from the auxiliary chamber out of the melting furnace entails removing the slag by means of slag sliding means.

3. A method for the removal of slag from a metallic melt bath in a melting furnace having a melting chamber and a furnace door, comprising the steps of:

placing the metallic melt bath within the melting furnace into a flow in the form of at least one turbulent flow having a substantially vertical turbulence axis and outer flow lines by using pump means;

displacing by means of said at least one turbulent flow the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber;

periodically removing the slag from the auxiliary chamber out of the melting furnace; and disposing of the removed slag in an environmentally protective manner in a slag container.

4. A method for the removal of slag from a metallic melt bath in a melting furnace having a melting chamber and a furnace door, comprising the steps of:

placing the metallic melt bath within the melting furnace into a flow in the form at least one turbulent flow having a substantially vertical turbulence axis and outer flow lines;

displacing by means of said at least one turbulent flow the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber by having the metallic melt bath flow through the slag barricade means;

periodically removing the slag from the auxiliary chamber out of the melting furnace; and disposing of the removed slag in an environmentally protective manner in a slag container.

5. A method for the removal of slag from a metallic melt bath in a melting furnace having a melting chamber and a furnace door, comprising the steps of:

placing the metallic melt bath within the melting furnace into a flow in the form at least one turbulent flow having a substantially vertical turbulence axis and outer flow lines;

displacing by means of said at least one turbulent flow the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber;

periodically removing the slag from the auxiliary chamber out of the melting furnace by removing the slag by means of floatable lifting means; and disposing of the removed slag in an environmentally protective manner in a slag container.

6. A method for the removal of slag from a metallic melt bath in a melting furnace having a melting chamber and a furnace door, comprising the steps of:

placing the metallic melt bath within the melting furnace into a flow in the form at least one turbulent flow having a substantially vertical turbulence axis and outer flow lines;

displacing by means of said at least one turbulent flow the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber;

periodically removing the slag from the auxiliary chamber out of the melting furnace, and disposing of the removed slag in an environmentally protective manner in a slag container, including the steps of:

holding down beneath the surface of the metallic metal bath within the auxiliary chamber and with closed furnace door a slag palette which reposes upon floatable lifting elements; and opening the furnace door and thus allowing the slag palette together with the slag reposing thereon to float up within the auxiliary chamber and the slag to slide into the slag container which has been placed at the region of an opening of the furnace door.

7. A method for the removal of slag from a metallic melt bath in a melting furnace having a melting chamber and a furnace door, comprising the steps of:

placing the metallic melt bath within the melting furnace into a flow in the form of two turbulent flows constituting a turbulent flow pair which flow in opposite directions with respect to one another and each of which have substantially vertical turbulence axis and outer flow lines;

displacing by means of said turbulent flows the slag which floats to the surface of the metallic melt bath towards said outer flow lines and into an auxiliary chamber formed behind slag barricade means at the region of the furnace door;

recirculating the metallic melt bath from the auxiliary chamber back into the melting chamber;

periodically removing the slag from the auxiliary chamber out of the melting furnace; and disposing of the removed slag in an environmentally protective manner in a slag container.

8. The method as defined in claim 7, wherein the step of:

placing the metallic melt bath within the melting furnace into a flow to produce two turbulent flows constituting a turbulent flow pair which flow in opposite directions with respect to one another entails using electromagnetic stirrer means located substantially centrally of the melting chamber; and additionally augmenting the action of the turbulent flow pair by providing further electromagnetic stirrer means arranged laterally at the height of the level of the metallic melt bath.

9. The method as defined in claim 8, further including the steps of:

holding down beneath the surface of the metallic metal bath within the auxiliary chamber and with closed furnace door a slag palette which reposes upon floatable lifting elements; and opening the furnace door and thus allowing the slag palette together with the slag reposing thereon to float up within the auxiliary chamber and the slag to slide into the slag container which has been placed at the region of an opening of the furnace door.

10. The method as defined in claim 7, wherein the step of:

placing the metallic melt bath within the melting furnace into a flow to produce two turbulent flows constituting a turbulent flow pair which flow in opposite directions with respect to one another entails using electromagnetic stirrer means located substantially centrally of the melting chamber; and additionally augmenting the action of the turbulent flow pair by providing pump means arranged laterally at the height of the level of the metallic melt bath.

11. An apparatus for the removal of slag from a metallic melt bath, comprising;
   a melting furnace having a melting chamber for housing the metallic melt bath;
   means for placing into movement the metallic melt bath within the melting chamber;
   a furnace door arranged at one side of the melting furnace;
   means for generating within the melting chamber at least one turbulent flow having a substantially vertical turbulence axis and outer flow lines;
   slag barricade means arranged at the region of the furnace door and extending into the melting chamber and forming an auxiliary chamber situated at the region of the outer flow lines of the at least one turbulent flow; and
   said auxiliary chamber serving to collect therein slag floating upon the metallic melt bath and which slag can be disposed of upon opening of the furnace door.

12. The apparatus as defined in claim 11, wherein:
   said means for generating within the melting chamber at least one turbulent flow serves to produce two turbulent flows which flow in opposite directions and each of which have a substantially vertical turbulence axis.

13. The apparatus as defined in claim 12, wherein:
   said generating means comprises electromagnetic stirrer means.

14. The apparatus as defined in claim 11, wherein:
   said generating means comprises electromagnetic stirrer means.

15. The apparatus as defined in claim 11, wherein:
   said generating means comprises pump means.

16. The apparatus as defined in claim 11, wherein:
   said generating means comprises electromagnetic stirrer means; and
   further electromagnetic stirrer means arranged at the region of the height of the level of the metallic metal bath in the melting chamber for at least augmenting the rotational sense of the at least one turbulent flow.

17. The apparatus as defined in claim 11, wherein:
   said slag barricade means comprises plate means arranged within the melting chamber substantially parallel to the furnace door and in spaced relationship therefrom;
   said plate means being provided with throughflow openings for the melt bath; and
   said plate means protruding above the level of the metallic melt bath into the melting chamber in order to hold back up-floating slag.

18. The apparatus as defined in claim 11, wherein:
   said slag barricade means comprises beam means arranged within the melting chamber;
   said beam means being disposed to enable the melt bath to flow therebelow; and
   said beam means protruding above the level of the melt bath into the melting chamber in order to hold back up-floating slag.

19. The apparatus as defined in claim 11, further including:
   means for enabling pivoting of the melting furnace at the side of the furnace door;
   said melting chamber having a floor;
   said auxiliary chamber having a floor; and
   said floor of the auxiliary chamber being located at a greater elevation than said floor of the melting chamber, so that upon upward pivoting of the melting furnace at the side of the furnace door the melt flows back out of the auxiliary chamber into the melting chamber and the slag remains at the region of the floor of the auxiliary chamber.

20. The apparatus as defined in claim 11, wherein:
   said melting chamber has corners located opposite the furnace door; and
   at least said corners being rounded for precluding the collection of slag at difficultly accessible regions of the melting furnace.

21. The apparatus as defined in claim 11, wherein:
   said auxiliary chamber is constructed as shaft means;
   at least one floatable lifting body guided for substantially vertical movement in said shaft means of said auxiliary chamber;
   a slag palette carried by said at least one floatable lifting body;
   holddown elements arranged at the furnace door;
   said holddown elements, when the furnace door is closed, pressing the lifting body and the slag palette beneath the level of the melt bath so that the slag can freely swim into the auxiliary chamber; and
   said holddown elements, when the furnace door is opened, releasing the slag palette in order to enable floatation thereof under the action of the lifting body.

22. The apparatus as defined in claim 21, wherein:
   said slag palette and lifting body are dimensioned such that the slag palette which floats upon opening of the furnace door has a slag palette surface located higher than a lower edge of the furnace door.

23. The apparatus as defined in claim 22, wherein:
   said slag palette is formed of a number of separate palettes so that individual palettes together with the slag deposited thereupon can be disposed of during a number of slag scraping operations as throwaway palettes in a slag container.

24. The apparatus as defined in claim 21, wherein:
   said at least one floatable lifting body comprises a plurality of lifting bodies possessing different water displacement;
   said plurality of lifting bodies extending substantially parallel to the furnace door in adjacent relationship to one another within the auxiliary chamber; and
   one of said lifting bodies being situated closer to the furnace door and protruding to a lesser extent above the level of the melt bath so that the slag palette which is supported upon the lifting bodies, upon ascent of the lifting bodies, experiences an inclination towards the furnace door which selectively renders possible an automatic sliding of the slag alone or in conjunction with the palette into a slag container which has been placed in a ready position for reception of the slag.

25. The apparatus as defined in claim 24, wherein:
   said plurality of lifting bodies each comprise a closed tube.

26. The apparatus as defined in claim 21, wherein:
   said at least one floatable lifting body comprises a plurality of lifting bodies possessing essentially the same diameter and arranged in different numbers above one another;
   said plurality of lifting bodies extending substantially parallel to the furnace door in adjacent relationship to one another within the auxiliary chamber; and one of said lifting bodies being situated closer to the furnace door and protruding to a lesser extent above the level of the melt bath so that the slag palette which is supported upon the lifting bodies, upon ascent of the lifting bodies, experiences an inclination towards the furnace door which selectively renders possible an automatic sliding of the slag alone or in conjunction with the palette into a slag container which has been placed in a ready position for reception of the slag.

27. The apparatus as defined in claim 11, further including:
 a slag container having a wall confronting the furnace door;
 said wall of the slag container being inclined at a greater angle than an angle of slope of the slag; and
 said wall of the slag container possessing a vertically upwardly tiltable cover with side screen means for screening dust.

* * * * *